United States Patent
Garth et al.

(10) Patent No.: US 7,120,648 B2
(45) Date of Patent: Oct. 10, 2006

(54) SYSTEM AND METHOD FOR PREDICTING EXECUTION TIME OF A DATABASE UTILITY COMMAND

(75) Inventors: John M. Garth, Gilroy, CA (US); James Alan Ruddy, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 10/082,327

(22) Filed: Feb. 26, 2002

(65) Prior Publication Data

US 2003/0163469 A1  Aug. 28, 2003

(51) Int. Cl.
G06F 17/30 (2006.01)

(52) U.S. Cl. .......... 707/104.1; 707/2; 709/224

(58) Field of Classification Search .......... 707/200, 707/204, 2, 101, 3, 104.1; 709/223, 224
See application file for complete search history.

(56) References Cited

U.S. PATENT DOCUMENTS

| | | | |
|---|---|---|---|
| 4,956,774 A | | 9/1990 | Shibamiya et al. |
| 5,301,317 A | | 4/1994 | Lohman et al. |
| 5,530,861 A | | 6/1996 | Diamant et al. |
| 5,734,884 A | * | 3/1998 | Eberhard et al. .......... 707/2 |
| 5,933,832 A | | 8/1999 | Suzuoka et al. |
| 6,002,869 A | | 12/1999 | Hinckley |
| 6,003,022 A | | 12/1999 | Eberhard et al. |
| 6,061,722 A | * | 5/2000 | Lipa et al. .......... 709/224 |
| 6,269,359 B1 | * | 7/2001 | Sekine .......... 707/2 |
| 6,353,818 B1 | * | 3/2002 | Carino, Jr. .......... 707/2 |

OTHER PUBLICATIONS

IBM Technical Disclosure Bulletin, vol. 37, No. 03, Method of Sharing an Intelligent Progress Bar Across Remote Machines, Mar. 1994, pp. 427-428.
DB2 for OS/390, DB2 UDB for OS/390 Estimator, IBM Corporation, 2001.
DB2 Management Tools Package, IBM DB2 Estimator, IBM Corporation, 1999.

* cited by examiner

Primary Examiner—Greta Robinson
(74) Attorney, Agent, or Firm—Sughrue Mion PLLC (57) ABSTRACT

The invention relates to a system and method for predicting the elapsed time required to execute a database utility command. A base of historical data is maintained containing information relating to the elapsed time required for previous database utility commands to execute. The elapsed time for a database utility command provides a consolidated measurement of all factors that affect processing time, including amount and type of data stored as well as changes within the computer system environment. Upper and lower control limits are calculated using statistical process control techniques to predict database utility command execution times. The technique may be used to validate and/or edit database utility command files containing multiple database utility commands, based upon whether the commands contained within are likely to fully execute within a specified batch window.

33 Claims, 5 Drawing Sheets

SYSTEM AND METHOD FOR PREDICTING EXECUTION TIME OF A DATABASE UTILITY COMMAND

BACKGROUND OF THE INVENTION

1. Field of the Invention

The invention relates to database management systems (DBMS). More particularly, it relates to database utilities for predicting the time required to execute database utility commands.

2. Description of the Related Art

Database administration tasks are frequently executed by running database utility commands or jobs. Often, these utilities can be run only when the database is inaccessible to users. The allowable length of this period of inaccessibility, sometimes referred to as the batch window, has declined substantially as business requirements for longer periods of data availability (such as the goal of 24 by 7 operation) have become stronger. Other database administration utilities do not require that data be inaccessible to users when the utility command is executed, but database administrators wish to schedule such utilities so that their execution causes the least possible impact (due to contention for resources such as CPU, memory, disk access, etc.,) to user transactions on the database.

Thus, a database administrator is faced with the problem of executing as many utility commands or jobs as possible given time and resource constraints. For example, assuming a database administrator is limited to a 4 hour period during which he or she can reorganize and make copies of databases. During that time the administrator must decide which databases to copy and which to reorganize so that all of the copy and reorganization tasks will be completed within the 4 hour period. To make this decision, the database administrator will want to know how long each utility command will take, so that he or she can schedule the utility commands with some confidence that they will complete in the required batch window.

One conventional approach for estimating the amount of time that a particular utility command will take to execute is to break down the utility command into its constituent sub-utility commands (such as reading or writing database records), apply rule-of-thumb formulas based upon the average time needed to complete such sub-utility commands, and compute a time estimate based upon the rule-of-thumb formulas tailored with relevant information about the database. Such an approach is aided by products such as IBM® Corporation's DB2® ESTIMATOR, which if provided with the database administrator's input as to the size of the database, number of columns, number of indexes, etc., will estimate the time required to execute a specific utility command.

One problem with this approach is that it is very labor intensive on the part of the database administrator, since he or she must supply the required parameters to the rule-of-thumb formula such as number of rows in the table, number of columns, number of indexes, length of index keys, etc. It also does not account for the natural variability of a computer system in which the elapsed execution time of an utility command can be affected by other work being performed on the same computer system.

A second problem with this approach is that the resultant estimate might not be accurate enough to ensure that the utility commands will complete in the required time. Not all of the sources of variability are captured by the rule-of-thumb formula technique described above. The formulas themselves are approximations of real conditions, and the exact numbers that the administrator must supply, such as size of the database, may not be known precisely enough.

A second approach is to use a simple measure, such as the total size of the object to be operated on, as a relative measure of elapsed execution time. However, such an approach is actually a very simplified version of the first approach described, above, and although less labor intensive to use, it suffers from many of the same problems identified above.

A more precise method and technique for predicting the time required to execute utility commands on a database is needed. That is, there is a need to accurately capture as many sources of variability as possible based upon real conditions affecting the database and the nature of the database itself, thereby increasing accuracy of the prediction, yet avoiding labor intensive input from a system administrator.

SUMMARY OF THE INVENTION

Therefore, in light of the above, and for other reasons that will become apparent when the invention is fully described, the elapsed time required to execute a database command is predicted by analyzing, with statistical analysis techniques, an elapsed time historical record containing previous database command execution times. The elapsed time historical record is automatically maintained by continually measuring and recording the execution times of executed database commands.

Upon a request from a database administrator via a user interface, a utility scheduling module assesses the historical record, containing a plurality of execution time measurements for previously executed database commands, to determine if sufficient records exist to reliably predict, using statistical analysis techniques, the execution time of an identified database command. If sufficient records exist to support statistical analysis, the utility scheduling module instructs a statistical analysis module to generate, using statistical analysis techniques, a database command execution time interval bracketed by an upper bound and lower bound execution time.

The above features and advantages of the invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

DETAILED DESCRIPTION

The embodiments described below are described with reference to the above drawings, in which like reference numerals designate like components.

In accordance with the present invention, techniques and devices are described for predicting the time required to execute database utility commands within a DBMS. A base of historical data is automatically maintained that includes elapsed execution times associated with specific utility commands previously executed within the DBMS. This historical base of information is statistically analyzed to predict, based upon probability, the time likely to be required when the utility command is next executed.

The estimates produced by this method are more accurate than conventional rule-of-thumb formula estimates, because they are based on historical data from the actual system environment where the utility command is being executed, rather than on some ideal, hypothetical system. Although a historical record of elapsed execution times for utility commands must be maintained here, the use of historical record data eliminates the need for a system administrator to enter parameters into a formula. The historical record of elapsed execution times can be maintained automatically, and hence, effort on the part of the database administrator is substantially reduced.

The approach uses historical elapsed execution times for a utility command to build a statistical confidence interval bracketed by a lower control limit (LCL) and an upper control limit (UCL). The generated LCL is a lower bound execution time with a known statistical probability that execution of the utility command will complete before expiration the LCL time. Similarly the generated UCL is an upper bound execution time with a known statistical probability that execution of the utility command will complete before expiration of the UCL time. By selectively setting the probability values associated with the LCL and UCL, respectively, the generated LCL and UCL execution times provide the database administrator with a good estimate of how much time is likely to be required to execute a database command. Such an approach easily accommodates natural variations in the elapsed execution time historical record and provides a solid basis for determining the reliability of the time estimates generated.

By generating statistically derived estimates rather than estimates based upon mere rule-of-thumb formulas, a database administrator is given the ability to control the degree of reliability associated with the execution time estimates generated. For example, the database administrator may choose a conservative execution time confidence interval for use with commands that must complete within a known execution time. The database administrator may choose a less conservative execution time confidence interval for use with commands with less stringent execution requirements.

Operational loads on a processing platform supporting a DBMS vary based upon the software processes simultaneously executed during the course of a day. Processor usage patterns often follow a daily cycle, based upon the day of the week and the time of day, overlayed by a monthly and/or quarterly usage cycle, depending upon the nature of the user community supported. As a result, once established, cyclical processor operational loads are highly predictable. Such operational loads might significantly impact the execution time of a database utility command. For this reason, the elapsed execution time historical database can include the day and time that the monitored utility commands were initiated. Grouping historical elapsed execution time records based upon execution time categories, such as "run during prime shift," "run on weekend," "run on third shift," etc. allows the generation of more accurate elapsed execution time estimates by incorporating the conditions under which the utility command will be executed.

Utility command options can also significantly affect the execution time of a utility command. For this reason, the historical elapsed execution time record can include the utility command options associated with a previously executed utility command, thereby providing yet another basis for improving the selection of historical elapsed execution time records, and thereby further refining execution time predictions.

A system administrator can use the techniques described here to knowledgeably add, remove, or edit individual commands that can be contained within a proposed command file containing a sequence of commands to be executed, to bring the predicted execution time of the entire command file within a desired execution time. In one non-limiting example, when a utility command takes less time than a predicted lower control limit (LCL) or longer than a predicted upper control limit (UCL), the database administrator is notified of the event so that corrective measures may be taken, if required.

Figure 1:
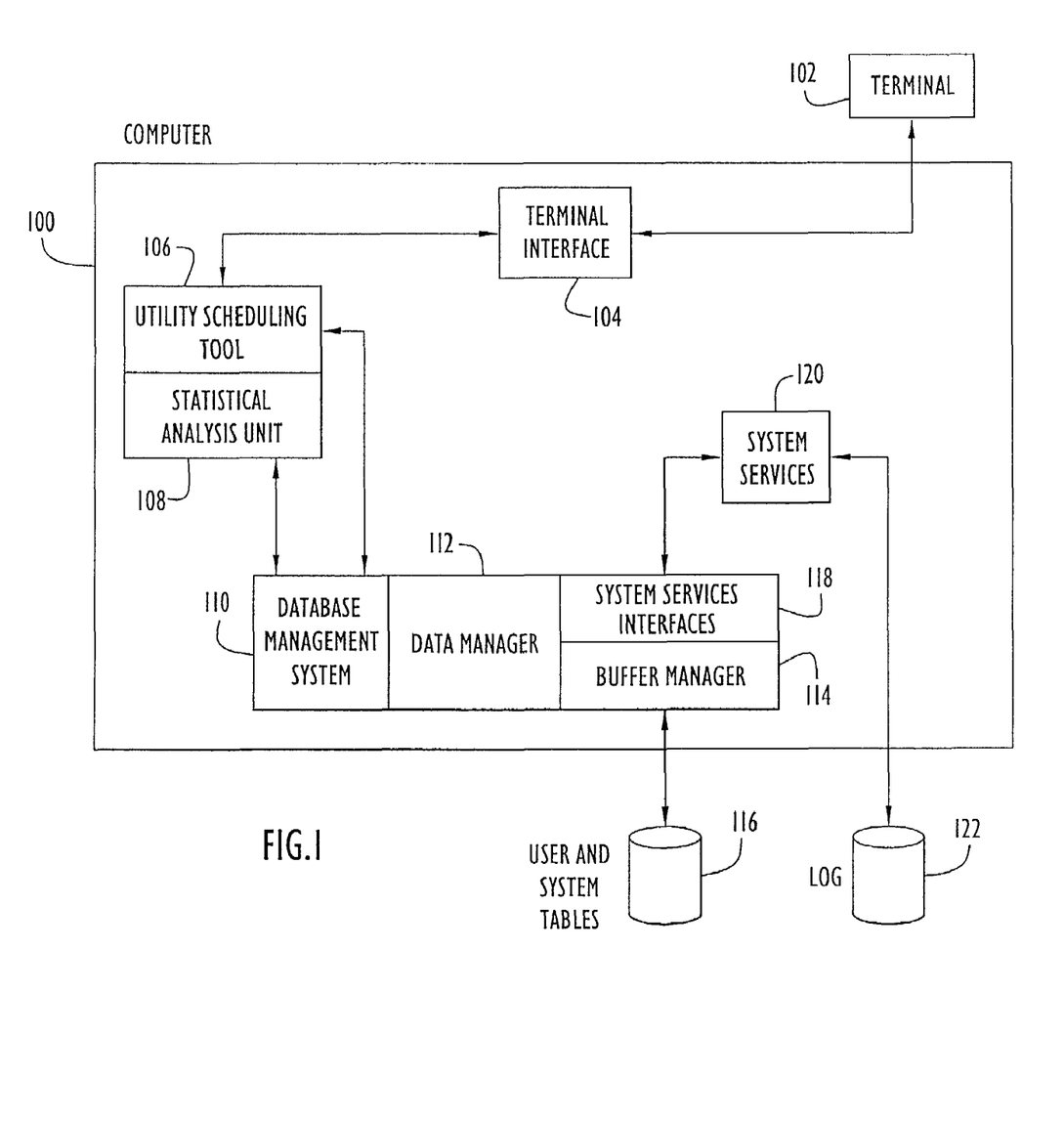
FIG. 1 is a block diagram of a database computing system with a scheduling tool that schedules execution of a database command based on statistical analysis of previous execution times of that command.

FIG. 1 presents a non-limiting representative embodiment of a database management system with a tool for predicting the time required to execute a DBMS utility command upon a computer 100. As shown, a conventional physical terminal 102 connects via a terminal interface 104 with a utility scheduling tool 106 to provide a database administrator with a human interface to the utility scheduling tool. At the direction of a database administrator, the utility scheduling tool 106 interacts with a statistical analysis unit 108 and a database management system 110 to coordinate record retrieval and statistical analysis. The statistical analysis unit 108, in addition to communicating with the utility scheduling tool 106, communicates with the database management system 110 to retrieve records to perform statistical analysis in response to requests received from the utility scheduling tool 106. The database manager 110 responds to requests for data and executes database utility commands via a data manager 112 that operates with a buffer manager 114 to control system and user data tables 116. Further, the database manager system 110 operates via a system services interface 118 to access system services 120, such as the system log 122.

Figure 2:
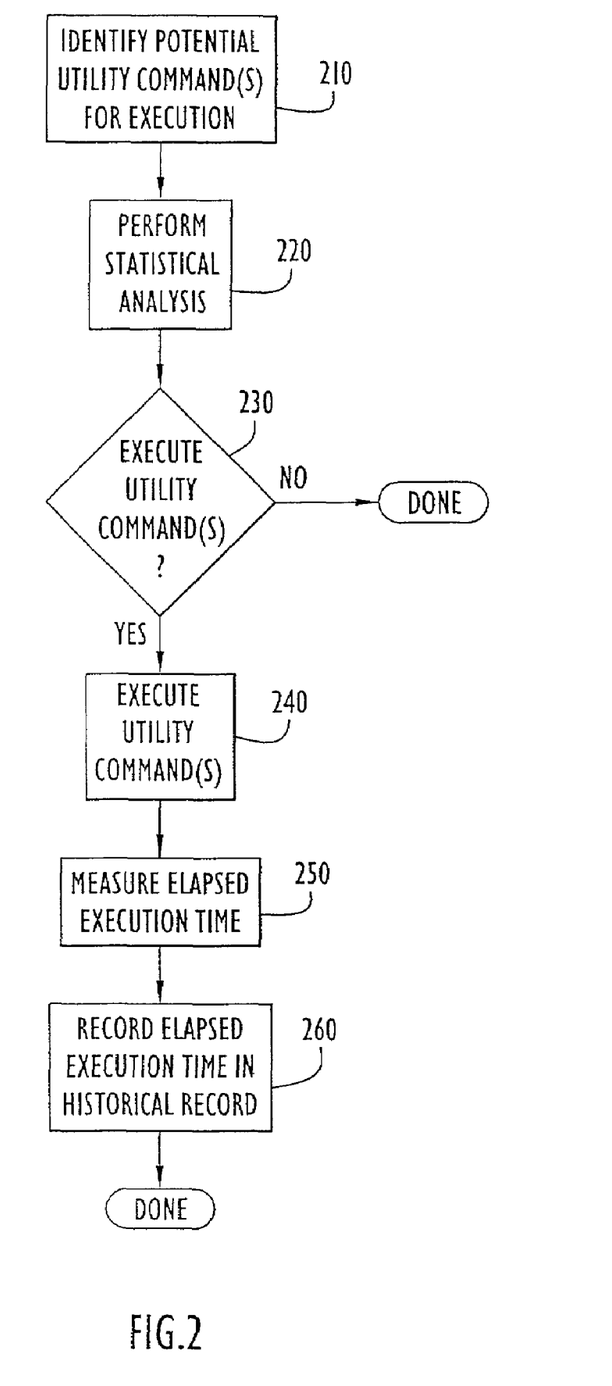
FIG. 2 is a flow chart illustrating a method for determining whether to execute a database command based on execution statistics calculated for database utility commands.

FIG. 2 is a non-limiting representative operational flow chart depicting a typical operational use of the prediction tool presented in relation to FIG. 1. First, a database administrator identifies one or more potential utility commands to be executed to the utility scheduling tool for execution 210. In one non-limited representative embodiment, referring again to FIG. 1, the database administrator interacts with the user terminal 102 (e.g., a monitor, keyboard and mouse) connected via the terminal interface 104 to the utility scheduling tool 106 running as a software application upon the computer 100. Via the user terminal 102, the database administrator can interact with the utility scheduling tool 106 using a command line, menu driven, or graphical user interface, for example, to input/select database utility commands for execution, and/or to select and edit command files containing utility commands for execution. For example, in one non-limiting embodiment, the database administrator can use a pull-down menu within a GUI interface to identify utility commands and their respective command options. In another non-limiting embodiment, the database administrator can identify an existing command file via a command line or GUI interface containing multiple utility commands and their respective command options.

Referring to FIG. 2, The database administer instructs the utility scheduling tool to perform a statistical analysis 220 of one or more of the potential database utility commands that are identified. Upon receiving a request for statistical analysis of the elapsed execution time for one or more of the potential utility commands, the utility scheduling tool retrieves previously stored historical records associated with the identified utility command(s) from the database system 110. These retrieved records contain historic elapsed execution times measured by the utility scheduling tool for the identified commands, along with other command execution-related information. The utility scheduling tool assesses information in the retrieved historical records and determines whether the historical records provide a sufficient basis for statistical analysis. If sufficient records exist to support a statistical analysis, the utility scheduling tool requests the statistical analysis unit 108 to generate an estimated execution confidence interval bracketed by a lower control limit (LCL) execution time and an upper control limit (UCL) execution time. The results of the statistical analysis are presented to the database administrator via the user interface.

For example, it is customary in statistical process control applications to use control limits three standard deviations from the mean. In embodiments of the utility scheduling tool that allow the database administrator to vary that number, the statistical analysis results displayed include an indication of the probabilities associated with the risk that the selected commands will not complete within the batch window identified. Such analysis results allow the database administrator to make educated decisions regarding whether to execute selected commands based upon the quantified risk that the selected commands will not complete within the batch window.

As indicated in FIG. 2, upon reviewing the statistical analysis results containing LCL and UCL values for one or more of the utility commands, the database administrator determines whether there is sufficient time within the batch window to execute one or more of the utility command(s) identified 230. In one non-limiting embodiment, the database administrator issues the utility command(s) using the utility scheduling tool 106 to forward the command(s) to the relational database system 110 which parses and executes the command(s) and interacts with the database data manager 112 and database buffer manager 114 to search, retrieve, add, delete, and/or modify the contents of user and system tables 116 according to the executed commands. Some actions initiated in response to executing the command(s) result in entries being made to one or more log files 122 by database system services 120 initiated by one or more system service interfaces 118 supported by the DBMS.

If no commands are executed, the process flow is complete. If the system administrator instructs the utility scheduling tool 106, via the user interface, to execute one or more identified utility commands, each identified utility command is submitted to the database system 110 for execution 240. The utility scheduling tool 106 measures the elapsed time required for the command to execute 250. The elapsed execution time measured for each utility command is then stored 260, along with previously measured execution times, within the base of historical utility command elapsed execution time data and the process completes.

Figure 3:
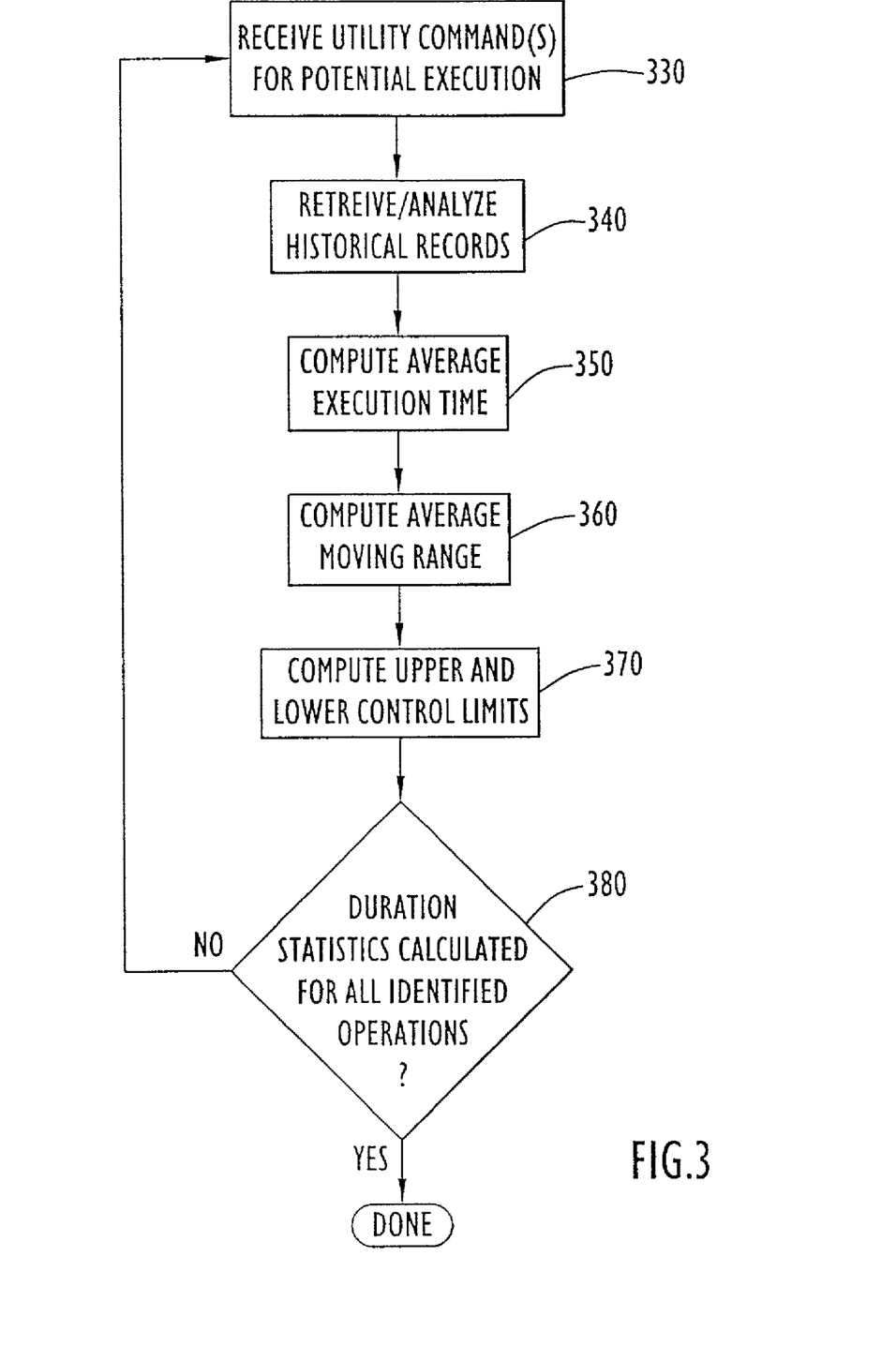
FIG. 3 is a flow chart illustrating the manner in which execution statistics are calculated for the database utility commands.

FIG. 3 presents a non-limiting representative embodiment of the operational flow associated with performing a statistical analysis for one or more identified potential utility commands, as discussed in relation to operation 220 in FIG. 2. The utility scheduling tool selects the first potential utility command 330 and retrieves and analyses N available historical records associated with the selected utility command 340, where N is an integer. Preferably, N should be at least five for statistical accuracy, but generally does not need to be higher than fifteen. Values outside this range are not precluded.

To generate statistically reliable LCL and UCL values, and related elapsed execution time statistics, it is recommended that between five and fifteen corresponding elapsed execution time historical records, that match the utility command to be executed, be located by the utility scheduling tool. Fifteen or more fully matched elapsed execution time historical records are likely to result in reliable LCL and UCL values, and related statistics, while using fewer than five fully matched elapsed execution time historical records, may result in an insufficient number of measured samples with which to generate reliable statistical results.

In one non-limiting representative embodiment, if the utility scheduling tool is unable to locate five elapsed execution time historical records that exactly match the utility command and command options given, or if the scheduled execution window does not generally correspond with the day/time period of execution of the available historical records, the user is alerted and provided an opportunity to review a summary of the records in the historical record to determine which records should be included in the statistical analysis. For example, in one non-limiting representative embodiment the database administrator is provided with an alert associated with the processing of a utility command indicating the number of exact matches within the database and the number of close matches in the database. A GUI based interface can be used in which, the alert message provides the database administrator with the ability to mouse click upon certain message objects to obtain additional information about available elapsed execution time records and to select elapsed execution time records for inclusion in the statistical analysis. In command based interfaces the same actions are performed by issuing a series commands at a command prompt.

If sufficient historical records exist to perform a statistical analysis, the statistical analysis unit computes an average execution time 350, average moving range 360, and upper and lower control limits 370. Once upper and lower control limits have been calculated for all identified utility commands 380 the operational flow is complete. Otherwise, the process is repeated for the next potential utility command identified by returning to operation 330.

The statistical analysis unit begins its statistical analysis by examining the historical records of measured elapsed execution times M(i) for the last N times the utility command was executed, where i is an integer ranging from 1 to N. The statistical analysis unit determines the average execution time (AvT) 350 for the N elapsed time measurements for the utility command by summing those measured elapsed execution times and dividing by N, as represented in equation (1), below.

$$AvT = \Sigma M(i)/N, \text{ where } i=1 \ldots N \qquad \text{Eq. (1)}$$

Once an average execution time has been determined, the statistical analysis unit computes the average moving range between measurements 360. For each measurement M(i) (where i ranges from 1 to N), the difference between the respective execution times is calculated and stored using equation (2), below.

$$MR(i)=M(i+1)-M(i), \text{ where } i=1 \ldots N \qquad \text{Eq. (2)}$$

From these moving range values, an average moving range (AvMR) is calculated by summing these N−1 moving ranges and dividing by N−1, as represented in equation (3), below 370.

$$AvMR=\Sigma MR(i)/N-1 \text{ where } i=1 \ldots N-1 \qquad \text{Eq. (3)}$$

As shown in FIG. 3, the average moving range, calculated as described above, is used to generate an upper control limit (UCL), shown in equation (4), and lower control limit (LCL), shown in equation (5), below. The UCL and LCL are estimates of the execution time, based upon a statistical curve centered upon the average execution time (AvT).

$$UCL=AvT+\#Stdev*(AvMR/1.128) \qquad \text{Eq. (4)}$$

$$LCL=AvT-\#Stdev*(AvMR/1.128) \qquad \text{Eq. (5)}$$

where AvMR is the average moving range,
where AvT is the average execution time, and
Stdev is the number of standard deviations from AvT.

The upper control limit UCL is a conservative statistical estimate for the amount of time the utility command will take. Assuming that the execution time measurements M(i) demonstrate a normal distribution, that the UCL is determined using equation four, above, and a value of three is used for #Stdev, the generated UCL is an execution time for which there is a 99.85% statistical probability, based upon the prior execution time history for the utility command, that the utility command will execute with an elapsed time smaller than the UCL (i.e., the UCL value is three standard deviations above AvT). Similarly, if a value of two is used for #Stdev, the resulting UCL is an execution time for which there is a 97.5% statistical probability that the command will execute with an elapsed time smaller than the UCL. Likewise, if a value of one is used for #Stdev, the resulting UCL is an execution time for which there is a 84% statistical probability that the command will execute with an elapsed time smaller than the UCL. Finally, if a value of zero is used for #Stdev, the UCL is the average execution time (AvT) for which there is 50% statistical probability that the command will execute within the UCL execution time.

A lower control limit (LCL) may be calculated as indicated in equation (5), above. LCL's are used to determine the probable minimum time for a command to execute, based upon the prior execution time history for the command. For example, if three is used for #Stdev in equation (5), above, the resulting LCL represents an execution time for which there is a 99.85% statistical probability, based upon the prior execution time history for the utility command, that the utility command will execute with an elapsed time greater than the LCL (i.e., the LCL value is three standard deviations below AvT). Similarly, if a value of two is used for #Stdev, the resulting LCL is an execution time for which there is a 97.5% statistical probability that the command will execute with an elapsed time greater than the LCL execution time. Likewise, if a value of one is used for #Stdev, the resulting LCL is an execution time for which there is a 84% statistical probability that the command will execute with an elapsed time greater than the LCL execution time. And finally, if a value of zero is used for #Stdev, the LCL is the average execution time (AvT) for which there is fifty percent statistical probability that the command will execute with an elapsed time greater than the LCL execution time.

By individually varying the values for #Stdev used to generate LCL's and UCL's, respectively, a database administrator is able to control the amount of acceptable risk associated with upper and lower execution times generated. With respect to UCL's, in operational environments in which very little risk is acceptable with respect to the upper execution time control limit, a higher value for #Stdev can be used, resulting in a longer, more conservative projected execution time. In operational environments in which a greater amount of risk is acceptable, a lower value for #Stdev can be used, resulting in a projected execution time closer to the generated average, but with lesser reliability. Conversely with respect to LCL's, a higher value for #Stdev results a smaller LCL execution time, and a lower value for #Stdev results in a projected execution time closer to the generated average.

In one non-limiting embodiment, the terminal interface 104 to the utility scheduling tool 106 can provide the database administrator the ability to set the value of #Stdev used in generating LCL and UCL values by setting a risk factor associated with each, using a command or parameter setting accessed through a graphical user interface (GUI). Accordingly, the database administrator can set the risk factors using a variety of different formats (e.g., probability of completion, absolute time to complete, etc.)

Figure 4:
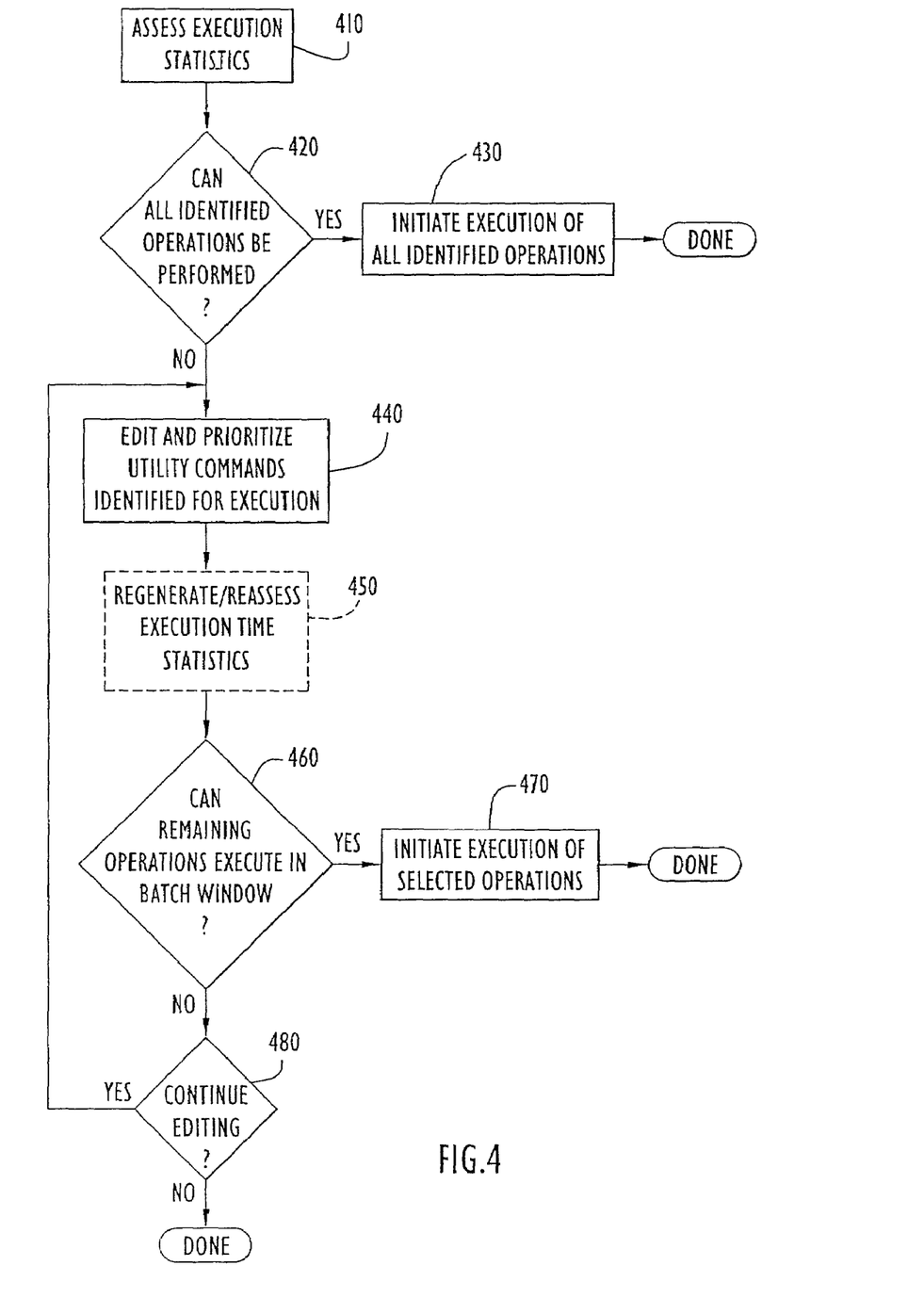
FIG. 4 is a flow chart illustrating the use of execution statistics to edit and refine command files, prior to execution.

As depicted if FIG. 4, upon generation of LCL's, UCL's and related statistics (e.g., average execution time, average moving range, number of records processed, etc.) the utility scheduling tool presents the user with the statistical results and allows the user to assess the execution statistics for a command file that contains a plurality of database utility commands to be executed 410. If the database administrator determines that all utility commands within the command file can be executed within the identified execution window 420, the database administrator can initiate execution of all the identified utility commands 430. Otherwise, the database administrator, via the user interface browser or editor, can manipulate the command file to edit and prioritize the utility commands identified for execution 440. For example, the database administrator might select a subset of the identified utility commands for execution by removing certain utility commands or editing some of the utility commands to use different options. Upon editing the identified utility commands, the database administrator regenerates the statistical analysis report by requesting a new statistical analysis of the edited utility commands 450. If, based upon the new statistical analysis, the database administrator is confident that all of the utility commands remaining in the command file after editing can be executed within the allotted batch window 460, execution of the command file is initiated 470 and the process completes. Otherwise, the database administrator determines whether to continue to edit the command file/ selected utility commands 480. If so, the process returns to operation 440 where the commands are further edited. If not, the process completes.

Figure 5:
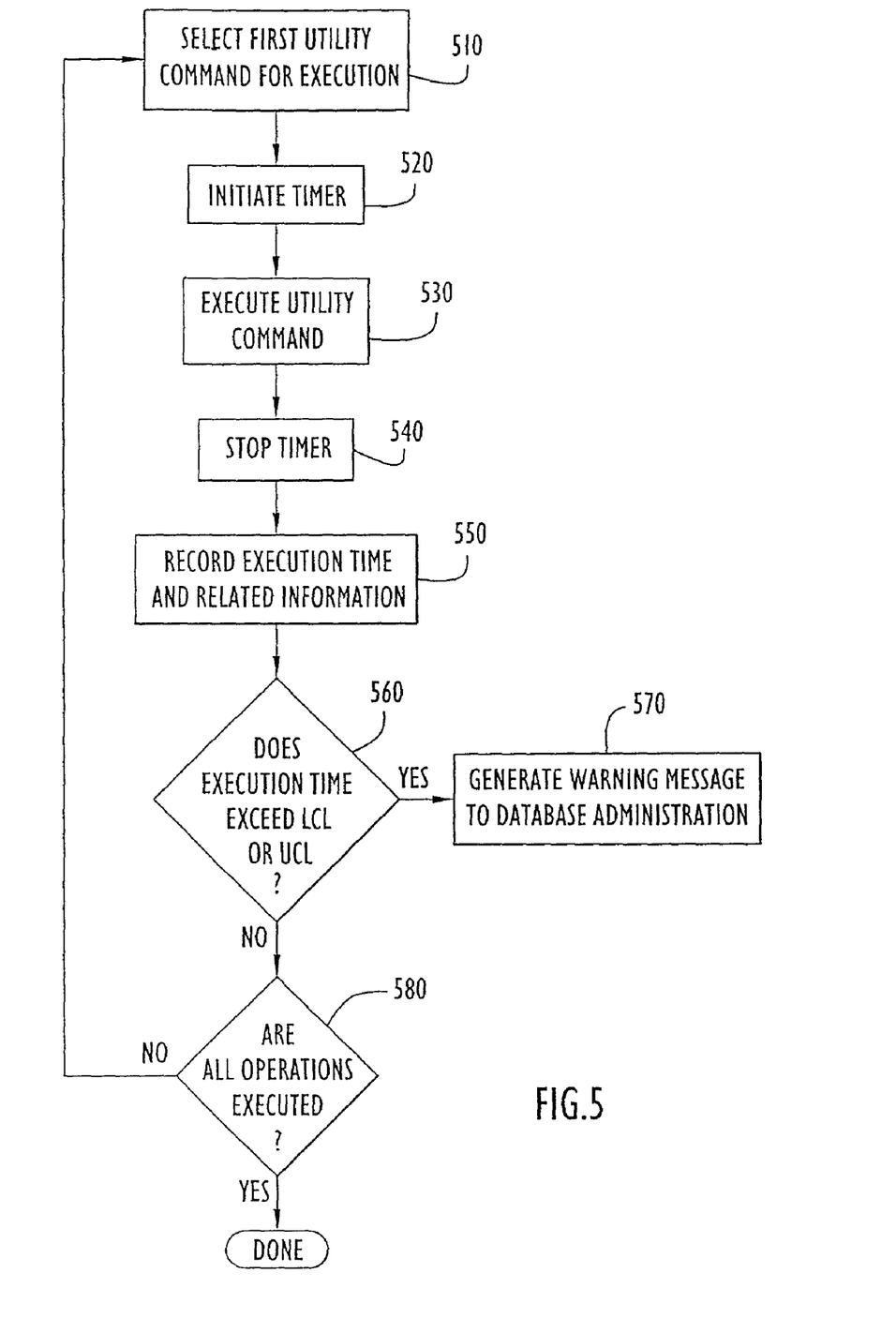
FIG. 5 is a flow chart illustrating the manner in which execution times are monitored and recorded to build historical elapsed execution time data records.

If, as indicated in FIG. 4 at operations 430 and 470, the database administrator decides to execute the identified utility command(s), execution is monitored by the utility scheduling tool according to the process depicted in the flowchart of FIG. 5. First, the utility scheduling tool selects a utility command to be executed 510 and initiates an execution timer 520 to begin timing. The utility scheduling tool then executes the utility command 530 by submitting the utility command to the DBMS which processes the command as described in relation to FIG. 1. Upon completion of the utility command, the DBMS returns a response to the utility scheduling tool that stops the previously set execution timer 540. The elapsed execution time is ascertained from the timer and the utility scheduling tool instructs the DBMS to create a new record in the to historical elapsed execution time table 550 and to populate the record with command execution information of the nature described, below.

If the execution time exceeds either the LCL or UCL 560, generated as described in relation FIG. 1, the utility scheduling tool generates and issues a warning to the database administrator 570. For example, if the elapsed execution time is briefer than the predicted LCL or exceeds the UCL, the command may have terminated in an abnormal manner, and/or a change of some significance may have occurred within the database or the database environment. In one non-limiting embodiment, the utility scheduling tool automatically halts execution of further utility commands, and/or terminates the command file in a safe manner, if a serious DBMS execution error is detected or an LCL or UCL is exceeded. Once all utility commands have been executed, as described above, the process is terminated 580, otherwise, the next utility command is executed 510.

As described above, if the recorded elapsed execution time of the N+1 measurement of a command is greater than the generated upper control limit, or less than the generated lower control limit for that command, a warning message is issued to notify the database administrator that a control limit has been exceeded and that some change may have occurred in the system to have caused the execution time to be outside the expected statistical limits. Generation of such optional alerts may be controlled by configuration parameters within the utility scheduling tool. An individual system, for example can be configured to generate an alert displayed on the user's terminal, and/or recorded via the database system service interfaces 118 and the respective system services 120, in one or more logs 122, or related to other applications via an integrated, system service supported application interface.

As previously discussed in relation to FIG. 2 and FIG. 5, upon completion of the utility command, the utility scheduling tool records the command elapsed execution time as record N+1 within the historical elapsed execution time data repository, so that the next time the utility command is executed, the elapsed execution time of the executed run is included in the estimate. Depending upon the embodiment employed, each relational database system can maintain its own historical records which can retain the information required on previously executed commands. Also, depending upon the embodiment employed, the content of the elapsed execution time historical record can vary depending on the needs of the system administrator and of the computing system, but can include the following:

1) The identification of the computer system upon which the utility command executed. For example, an embodiment operating upon a multiprocessor computer with multiple instances of a database, might include a processor ID and a database subsystem name.

2) The name of the utility command executed. For example, the name of a command used to reorganize the database, to copy a table, to recover a table space from a copy, or to load new data, etc. Ideally, a sufficient number of records that exactly match the command to be executed will be located in the store of historical elapsed execution times for use in generating LCL and UCL values, as previously discussed. The utility command name can play a role in locating applicable historic records.

3) The object or objects upon which the utility command was executed. For example, in a relational DBMS, this might be a table space name or an index space name.

4) The elapsed time required to execute the command.

5) The day and time that the utility command was initiated. For example in one non-limiting representative embodiment, this parameter is used to separate jobs into categories such as "run during prime shift," "run on weekend," "run on third shift," etc. Categorization such as this can produce, depending upon the system environment and work load, more accurate elapsed execution time control limits.

6) Options used with the utility command. For example, commercial reorganization utilities often have various options that a user can specify, such as a key word or parameter for controlling how the reorganization is to be performed in order to improve performance, data availability, or recoverability. Since the use of such options can effect a utility command's elapsed execution time, sub-categorization of utility commands based upon the options used may assist in defining narrower control limits, resulting in more accurate elapsed execution time control limits. For example, if one of the objectives of a reorganization is to place all table records in order by a key, the reorganization can be performed either by reading all records sequentially from the table and then sorting them by the key, or by reading the records through an index on the key. The option chosen can be used to sub-categorize the otherwise identical utility commands.

The non-limiting embodiment described in relation to FIG. 1 that supports the operational flows described in relation to FIGS. 2–5, is not limited to implementation upon a single computer. In one non-limiting embodiment, for example, the database administrator's user interface, which includes terminal 102 and terminal interface 104, is implemented upon one computer interfacing via a local area network (LAN) and/or a wide area network (WAN) and/or the Internet with a shared server that supports the utility scheduling tool 106 and the statistical analysis unit 108. The shared server supporting the utility scheduling tool and statistical analysis unit can then support the generation of LCL, UCL, and related statistics for an unlimited number of similarly networked DBMS platforms. In such an example, each DBMS can maintain a table of elapsed execution time historical record for all utility commands executed upon it, or alternatively, one or more DBMS platforms can be designated to serve as a consolidated storage facility for elapsed execution time historical record. In another non-limiting embodiment, elapsed execution time historical records are stored using a formatted text file or other record storage scheme with which the utility scheduling tool and statistical analysis unit can operate without relying upon the use of an DBMS managed database for the storage and maintenance of elapsed execution time historical records.

The methods and apparatuses described here are not limited to operating with any particular operating system, or to any particular database management system. Furthermore, the methods and systems described here can be used to maintain an elapsed execution time historical record and to generate LCL, UCL, and related statistics, as described in relation to FIG. 1, for any type of utility command, not necessarily utility commands associated with database maintenance.

It will be understood that the terminal interface 104, utility scheduling tools 106, statistical analysis tool 108, database management system 110, including the data manager 112, buffer manager 116, and system services interfaces 118 can be implemented as software programs. Such software is embodied on a computer-readable medium of expression, such as magnetic media, optical disks, semiconductor memories, etc. The software instructions within these modules, when executed by a computer, cause the computer to perform the functions described above. It will also be understood that the functions described above can be performed using appropriately configured hardware or combinations of hardware and software.

Having described preferred embodiments of systems and methods for predicting the elapsed execution time of a database utility command using statistical process control techniques, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A method for predicting the time required to execute a database command, comprising:
   measuring a plurality of execution times to complete the database command, wherein the database command is a database utility command;
   recording the measured execution times, thereby creating a time historical record;
   using the time historical record to estimate the time required to execute the database command, by selecting a historical record for analysis based upon one or more of the following:
   a) the database utility command;
   b) an option specified with a previously executed instance of the database utility command;
   c) the time that the previously executed instance of the database utility command was executed;
   d) the day that the previously executed instance of the database utility command was executed;
   e) a processor load on a machine executing a previously executed instance of the database utility command; and
   f) a storage access load on a machine executing a previously executed instance of the database utility command.

2. The method of claim 1, wherein said using the time historical record includes analyzing the time historical record by using a statistical analysis technique to estimate the time required to execute the database command.

3. The method of claim 2, wherein said analyzing the time historical record includes computing an average execution time based upon information concerning the database command from the time historical record.

4. The method of claim 3, wherein the average execution time is $AvT = \Sigma M(i)/N$, where i is an integer and varies from 1 to N, N equals the number of measurements recorded in the historical record of the execution time of the database command, and M(i) is an ith measurement of the execution time of the database command.

5. The method of claim 2, wherein said analyzing the time historical record includes computing a moving range between prior measurements of the database command, based upon information from the time historical record.

6. The method of claim 5, wherein the moving range is $MR(i)=M(i+1)-M(i)$, where i is an integer that varies from 1 to N, and M is a measurement of an execution time of the database command.

7. The method of claim 2, wherein said analyzing the time historical record includes computing a maximum execution time.

8. The method of claim 7, wherein said analyzing the time historical record includes computing the maximum execution time based upon a specified confidence value.

9. The method of claim 8, wherein the specified confidence value is configurable based upon a probability that the database command will execute in less time than the computed maximum execution time.

10. The method of claim 7, further comprising:
    executing the database command;
    measuring a time to execute the database command; and
    issuing a warning if the measured time to execute the database command exceeds the maximum execution time.

11. The method of claim 10, wherein the warning is a warning that a configuration of the database may have changed.

12. The method of claim 2, wherein said analyzing the time historical record includes computing a minimum execution time.

13. The method of claim 12, wherein said analyzing the time historical record includes computing the minimum execution time based upon a specified confidence value.

14. The method of claim 13, wherein the specified confidence value is configurable based upon a probability that the database command will execute in less time than the computed minimum execution time.

15. The method of claim 12, further comprising:
    executing the database command;
    measuring a time to execute the database command; and
    issuing a warning if the measured time to execute the database command is less than the minimum execution time.

16. The method of claim 15, wherein the warning is a warning that a configuration of the database may have changed.

17. The method of claim 1, further comprising recording within the time historical record the time of execution of said measured database utility command.

18. The method of claim 17, further comprising recording within the time historical record the day of execution of said measured database utility command.

19. The method of claim 1, further comprising recording within the time historical record a database utility command option executed with said measured database utility command.

20. The method of claim 1, further comprising recording within the time historical record a processor load of a computer executing said measured database utility command.

21. The method of claim 1, further comprising recording within the time historical record a storage access load of a computer executing said measured database utility command.

22. The method of claim 1, further comprising determining if a plurality of database commands can execute within a fixed timeframe by analyzing each of the plurality of commands based on prior execution time measurements for each of the plurality of database commands.

23. The method of claim 1, wherein said database command is a command file containing a plurality of database commands.

24. The method of claim 23, wherein times required to execute database commands within said command file have been estimated, the method further comprising:
    editing the database command file;
    analyzing the time historical record using a statistical analysis technique to generate new estimates of the time required to execute database commands contained within the edited command file.

25. An apparatus for predicting the time required to execute a database command, comprising:
 a historical record module having recorded therein a plurality of measurements of execution times of the database command wherein the database command is a database utility command;
 an analysis module coupled to the historical record module and configured to analyze the measurements recorded in the historical record module by selecting a historical record for analysis based upon one or more of the following:
 a) the database utility command;
 b) an option specified with a previously executed instance of the database utility command;
 c) the time that the previously executed instance of the database utility command was executed;
 d) the day that the previously executed instance of the database utility command was executed;
 e) a processor load on a machine executing a previously executed instance of the database utility command; and
 f) a storage access load on a machine executing a previously executed instance of the database utility command; and
 a utility scheduling module configured to determine whether to execute the database command based on an analysis of the database command measurements.

26. The apparatus of claim 25, wherein the analysis module is configured to statistically analyze the time historical record to estimate the time required to execute the database command.

27. The apparatus of claim 25, wherein the utility scheduling module is configured to determine whether a plurality of database commands can execute within a fixed timeframe based on the analysis module analyzing measurements relating the plurality of measurements recorded in the historical record module.

28. The apparatus of claim 25, further comprising a user interface module configured for enabling a user to specify the database command to be analyzed.

29. An apparatus for predicting a time for executing a database command, comprising:
 means for measuring a time to complete the database command wherein the database command is a database utility command;
 means for recording the measured time, thereby creating a time historical record; and
 means for analyzing the time historical record to estimate the time required to execute the database utility command by selecting a historical record for analysis based upon one or more of the following:
 a) the database utility command;
 b) an option specified with a previously executed instance of the database utility command;
 c) the time that the previously executed instance of the database utility command was executed;
 d) the day that the previously executed instance of the database utility command was executed;
 e) a processor load on a machine executing a previously executed instance of the database utility command; and
 f) a storage access load on a machine executing a previously executed instance of the database utility command.

30. The apparatus of claim 29, wherein said means for analyzing uses a statistical analysis technique to analyze the time historical record to estimate the time required to execute the database command.

31. A computer program embodied on a computer readable medium for predicting a time for executing a database command, comprising:
 program instructions for measuring a time to complete execution of the database command wherein the database command is a database utility command;
 program instructions for recording the measured time, thereby creating a time historical record; and
 program instructions for analyzing the time historical record to estimate the time required to execute the database utility command by selecting a historical record for analysis based upon one or more of the following:
 a) the database utility command;
 b) an option specified with a previously executed instance of the database utility command;
 c) the time that the previously executed instance of the database utility command was executed;
 d) the day that the previously executed instance of the database utility command was executed;
 e) a processor load on a machine executing a previously executed instance of the database utility command; and
 f) a storage access load on a machine executing a previously executed instance of the database utility command.

32. The computer program of claim 31, wherein said program instructions for analyzing use a statistical analysis technique to analyze the time historical record to estimate the time required to execute the database command.

33. A method for predicting the time required to execute a database command, comprising:
 measuring a plurality of execution times to complete the database command wherein the database command is a database utility command;
 recording the measured execution times, thereby creating a time historical record;
 using the time historical record to estimate the time required to execute the database command by selecting a historical record for analysis based upon one or more of the following:
 a) the database utility command;
 b) an option specified with a previously executed instance of the database utility command;
 c) the time that the previously executed instance of the database utility command was executed;
 d) the day that the previously executed instance of the database utility command was executed;
 e) a processor load on a machine executing a previously executed instance of the database utility command; and
 f) a storage access load on a machine executing a previously executed instance of the database utility command;
 wherein said database command is a command for which a time required to execute has been estimated, the method further comprising:
 editing the database command;
 analyzing the time historical record using a statistical analysis technique to generate an estimate of the time required to execute the edited database command.

* * * * *